J. E. WYATT.
CULINARY IMPLEMENT.
APPLICATION FILED APR. 17, 1912.
1,041,221.
Patented Oct. 15, 1912.
2 SHEETS—SHEET 1.
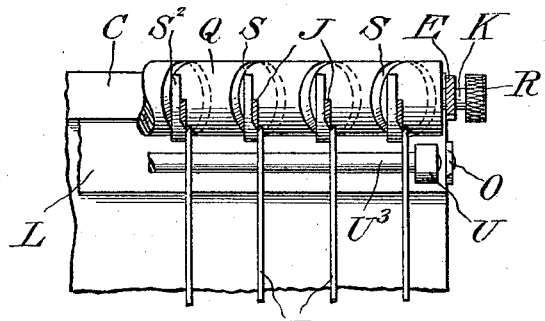
Fig. 3.
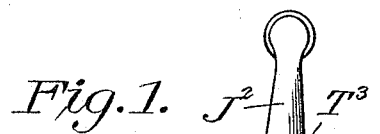
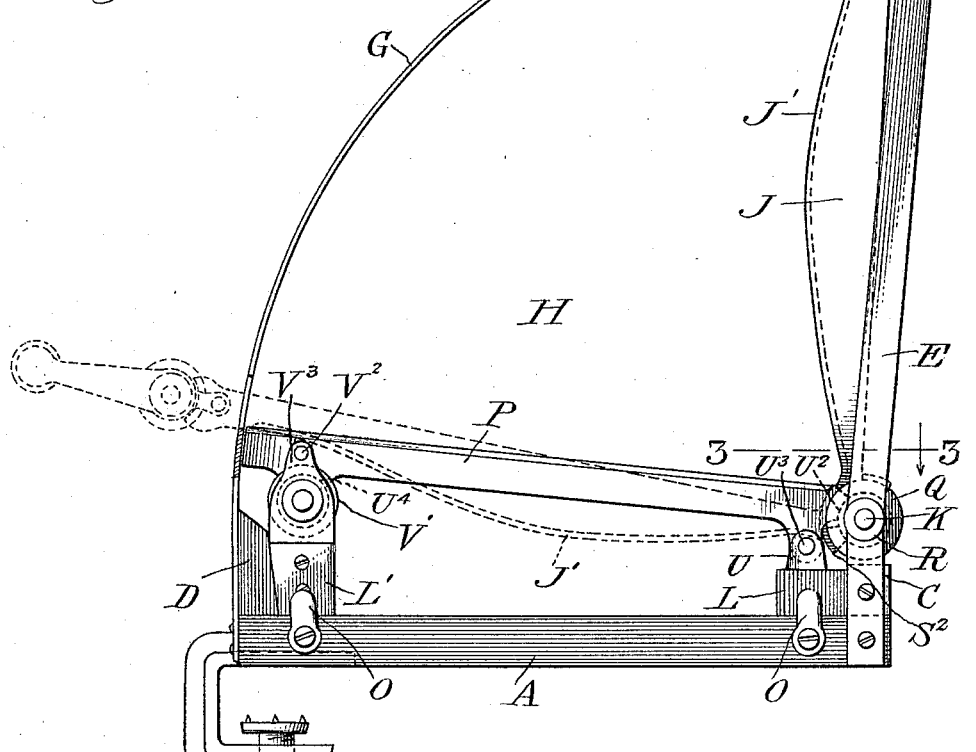
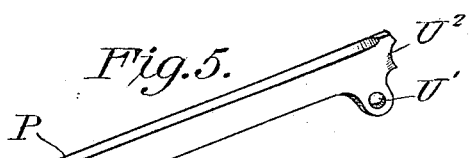
Fig. 5.
WITNESSES
Fenton S. Bell
M. E. Moore
James E. Wyatt
INVENTOR
By
Attorney

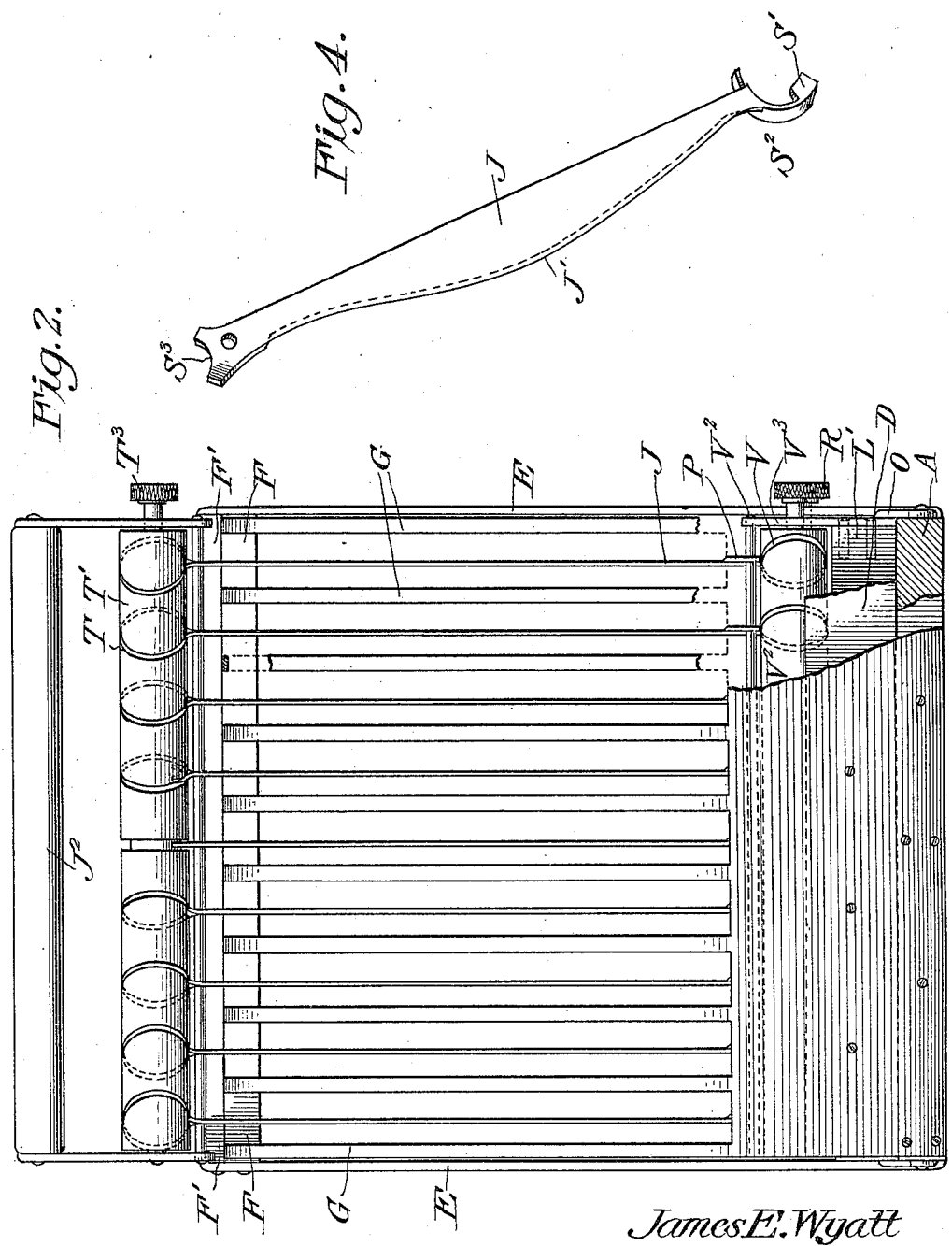

UNITED STATES PATENT OFFICE.

JAMES E. WYATT, OF YANTIS, TEXAS.

CULINARY IMPLEMENT.

1,041,221.   Specification of Letters Patent.   Patented Oct. 15, 1912.

Application filed April 17, 1912. Serial No. 691,293.

*To all whom it may concern:*

Be it known that I, JAMES E. WYATT, a citizen of the United States, residing at Yantis, in the county of Wood and State of Texas, have invented certain new and useful Improvements in Culinary Implements, of which the following is a specification.

My invention relates to improvements in culinary implements, and refers particularly to an implement or device capable of slicing vegetables, meats, bread, or other food material where necessary to cut in thin slices.

One object of the invention is the provision of an implement which will rapidly cut the material into slices of any desired and required thickness, and which can be produced at a price to make its use highly desirable.

Another object of my invention is the provision of a culinary implement which will be of compact and small size to occupy a very small space, while possessing a large capacity for service, which will be simple and durable in construction, which can be taken apart for purposes of cleaning and repair or for sharpening the knives or cutters, which can be readily adjusted, and which in general will be efficient and practical.

A further object of my invention is the provision of a culinary implement having adjustably mounted knives or cutters whereby the thickness of the cut may be regulated as required, and which adjusting mechanism may be easily and quickly operated to secure the proper spacing of the cutters with respect to each other to produce an even and shear cut.

With these objects in view, the invention consists primarily of a frame or support, a knife guide carried by the frame, a reciprocating cutter comprising a series of similar parallel disposed blades, a rigid co-acting cutter comprising a series of blades arranged to operate in cojunction with the reciprocating cutter and to gage the size of the slices into which the food is cut, and adjusting mechanism for both the reciprocating and stationary cutters whereby these members may be adjusted laterally with respect to each other to secure a given thickness of cut.

The invention further consists of an implement or device of the character and for the purpose stated embodying novel features of construction and combination of parts, substantially as disclosed herein.

Figure 1 is a side elevation of a complete culinary implement constructed in accordance with and embodying the principles of my invention, the position the reciprocating cutter assumes when in the act of cutting an object being indicated in dotted lines. Fig. 2 is an end view, partly in section, of the complete implement. Fig. 3 is a detail view of a part of the adjusting mechanism, taken on lines 3—3 of Fig. 1. Fig. 4 is a perspective view of one of the reciprocable knife blades detached, and Fig. 5 is a perspective view of one of the stationary knife blades detached.

In the drawings:—The letter A designates the base or support of the implement, which is provided with a bracket clamp B for securing the implement to a table or other suitable stationary structure, and from one edge of the base rises the longer strip D. From the strip C extends upward the pair of braces E, whose upper ends are secured to the strip F, between which and the upper strip F' are secured the upper ends of the knife guides G, the lower ends of which are secured to the vertical strip D, which strip serves to brace and support the knife guides. From this construction it will be observed that the implement is attached to a suitable supporting structure and that an open discharge portion H is provided at one side through which the slices of material after being cut can fall, and that a series of knife guides are provided for the reciprocating cutter, which consists of a series of blades J, pivoted at their lower ends upon the rod K and formed with the curved cutting edge J', and to the extended ends of the blades is secured the operating handle or grasping device J².

On the base of the implement is mounted the stationary cutter of my implement, which comprises the short strip L and the longer strip L', and which permit the movement of the cutter frame in the base, and to secure said cutter frame in position I employ suitable keepers or retaining devices O.

It will be apparent that the arrangement of the pairs of strips insures an incline to the series of blades P, which comprise the stationary cutter of my device, and in operation when the reciprocating cutter descends upon the material to be cut, there is a coaction between the reciprocating cutter and the stationary cutter which insures a smooth and even shear cut in order that the material may be sliced evenly and with perfect smoothness.

The means for adjusting the cutter members with respect to each other are extremely simple and efficient and comprise a roller Q mounted on the rod K, having the milled head R, and the roller is provided with a series of grooves S in which fit the lugs S' of the split collar S² of the reciprocating knives J, the upper ends of which are cut away as at S³ to form engaging portions to fit in the grooves T of the upper roller T', mounted upon a rod T², having a milled head T³ whereby it may be easily rotated. As best shown in Fig. 2, these grooves in the rollers are of peculiar configuration, the central groove being vertical in cross-section and the others spiral and increasing proportionately in diameter as they approach the sides of the implement.

Mounted in ears U rising from the short strip L and passing transversely through the openings U' of the stationary blades P of the cutter, which blades are formed with cut out portions U² engaging in the grooves of the roller Q, is a rod U³. The other ends of the blades P are formed with cut away portions U⁴ engaging grooves V in the roller V' mounted upon the longer strip L' of the base of the implement, a rod V² being mounted in ears V³ on the longer strip L', and serving with the opposite rod U³ as guides upon which the blades slide. From this construction it will be seen that the blades may be brought nearer to each other by rotating the respective rollers and provision thus be made for cutting various thicknesses of slices, the roller Q being provided with larger grooves than the other rollers to accommodate the ends of both the reciprocating and stationary knife blades and thus obviating the necessity of using a fourth roller.

The operation of my implement will be readily understood from the foregoing description taken in connection with the accompanying drawings, and I would simply state that the loaf of bread, head of cabbage, or piece of meat as a whole is placed within the frame and knife guides and when the reciprocating cutter descends, the food in its entirety is cut into a series of equal sized slices or strips.

The advantages of my invention will be readily understood and appreciated and such an implement will prove practical and useful in the household and particularly desirable in hotels, restaurants, and like places where it is desired to cut the food rapidly into slices of equal size and thickness.

I claim:—

1. A culinary implement of the character and for the purpose described, comprising a supporting frame, a knife guide consisting of a series of parallel disposed strips, a reciprocating cutter consisting of a series of similar parallel disposed knives guided in said knife guide, and a stationary cutter mounted in the frame and arranged to co-act with the knives of the reciprocating cutter.

2. A culinary implement of the character and for the purpose described, comprising a supporting frame, a knife guide consisting of a series of parallel disposed strips, a reciprocating cutter consisting of a series of similar parallel disposed knives guided in said knife guide, and a stationary cutter mounted in the frame and arranged to co-act with the knives of the reciprocating cutter, and means for adjusting the knives of said cutters to gage the thickness of the slices of material to be cut thereby.

3. A culinary implement of the character and for the purpose described, comprising a supporting frame, a knife guide consisting of a series of parallel disposed strips, a reciprocating cutter consisting of a series of similar parallel disposed knives guided in said knife guide, a stationary cutter mounted on the frame and arranged to co-act with the knives of the reciprocating cutter, and means for adjusting the knives of said cutters with respect to each other, said means consisting of grooved rollers in which the blades are received and operating rods upon which the rollers are mounted whereby said rollers may be rotated.

4. In a culinary implement, the combination of a frame, a reciprocating cutter composed of a plurality of blades, a stationary cutter composed of a plurality of blades, a grooved roller mounted upon the frame in which the ends of the blades of both cutters are received, a rod for rotating said roller, rollers engaging the outer ends of the blades of the reciprocating and stationary cutters respectively, and rods upon which said rollers are mounted for rotating said rollers.

5. A culinary implement of the character and for the purpose described, consisting of a frame, a knife guide carried by the frame, an open discharge portion adjacent the guide, a reciprocating cutter pivoted in the frame and consisting of a series of parallel disposed knives having curved cutting edges, and a stationary cutter consisting of a series of parallel disposed knives arranged at an incline to co-act with the cutting edges of the reciprocating cutter knives to give a shear clean cut to the material.

6. A culinary implement, consisting of a frame, a reciprocating cutter, a stationary cutter, the upper ends of the reciprocating cutter being formed with cut out portions, a grooved roller engaging said cut out portions, a lower grooved roller, collars formed upon the lower ends of the reciprocating cutter and having lugs engaging in said grooves of the lower roller, cut out portions upon the inner ends of the stationary cutter also engaging in the grooves of the lower roller, and an outer roller engaged by the outer ends of the stationary cutter, said rollers comprising means for adjusting the stationary and reciprocating cutters.

7. In a culinary implemnet, the combination of a frame, a reciprocating cutter and a stationary cutter, each composed of a plurality of blades, a grooved roller mounted upon the frame in which the ends of both of the cutters are received, and rollers engaging the outer ends of the blades of both cutters whereby the cutters may be adjusted with respect to each other.

In testimony whereof I affix my signature in presence of two witnesses.

JAMES E. WYATT.

Witnesses:
J. A. WYATT,
JOHN A. MOORE.

Copies of this patent may be obtained for five cents each, by addressing the "Commissioner of Patents, Washington. D. C."